United States Patent [19]

Ekstrand

[11] Patent Number: 5,047,609

[45] Date of Patent: Sep. 10, 1991

[54] CROSSED DOT BAR GRAPH DISPLAY FOR INDICATION OF POSITION OF A LIGHT BEAM, AND AN IMPROVED LASER SYSTEM WITH ACTIVE LASER CAVITY ALIGNMENT USING SAME

[75] Inventor: John P. Ekstrand, Palo Alto, Calif.

[73] Assignee: Spectra-Physics, San Jose, Calif.

[21] Appl. No.: 461,359

[22] Filed: Jan. 5, 1990

[51] Int. Cl.5 ............................................. B23K 26/02
[52] U.S. Cl. .......................... 219/121.78; 219/121.74; 219/121.83; 356/152; 356/400; 356/401
[58] Field of Search ...................... 219/121.78, 121.83, 219/121.61, 121.62, 121.79, 121.81, 121.74; 356/152, 138, 153, 375, 376, 400, 401

[56] References Cited

U.S. PATENT DOCUMENTS 4,764,982 8/1988 Pfund ............................. 356/152 X
4,767,209 8/1988 Johnson ............................. 356/152

Primary Examiner—C. L. Albritton

Attorney, Agent, or Firm—Fliesler, Dubb, Meyer & Lovejoy

[57] ABSTRACT

A system for displaying information concerning position of a light beam comprises a detector generating a first signal indicating position of the beam along a first dimension, and a second signal indicating position of the beam along a second dimension. A crossed dot bar graph display is coupled to receive the first and second signals. The crossed dot bar graph display includes a first linear array of indicators (LEDs) for indicating position along the first dimension, and a second linear array of indicators for indicating position along the second dimension. The first and second linear arrays intersect at a center indicator. One dot is displayed in the first array showing deviation in the first dimension. One dot is displayed in the second display showing deviation in the second dimension. When both dimensions are aligned to the center indicator, only the center indicator is activated. The system can be expanded to any number of dimensions.

13 Claims, 3 Drawing Sheets

CROSSED DOT BAR GRAPH DISPLAY FOR INDICATION OF POSITION OF A LIGHT BEAM, AND AN IMPROVED LASER SYSTEM WITH ACTIVE LASER CAVITY ALIGNMENT USING SAME

FIELD OF THE INVENTION

The present invention relates to display configurations for indicating to an operator of a laser system the position of a laser beam in a plurality of dimensions.

DESCRIPTION OF RELATED ART

In lasers with active mirror alignment systems, the position of the output beam can be controlled by adjusting the tilt of a mirror in the laser cavity about an X and a Y axis, and by adjusting the translation of the mirror along the Z axis. It is often desirable in such systems to provide feedback to an operator for alignment of the laser cavity. Such feedback is provided in the prior art by separate position indicators for each dimension using analog meters or bar graphs. These prior art systems using separate visual feedback for each dimension being measured do not provide direct visual feedback as to how to correct the mirror position. Each action affects 2 or 3 separate displays which must be surveyed independently.

Without direct feedback for all dimensions, it is often cumbersome for an operator to attempt to tune the alignment of the mirror in the system.

Accordingly, it is desirable to provide a display which improves the visual feedback provided to an operator of a laser system, or other system generating a light beam which requires positioning.

SUMMARY OF THE INVENTION

The present invention provides an apparatus for displaying information concerning position of a light beam comprising a detector generating a first signal indicating position of the beam along a first dimension, and a second signal indicating position of a beam along a second dimension. A crossed dot bar graph display is coupled to receive the first and second signals. The crossed dot bar graph display includes a first linear array of indicators for indicating position along the first dimension, and a second linear array of indicators for indicating position along the second dimension. The first and second linear arrays share a center indicator at which they intersect. One dot is activated in the first array showing deviation in the first dimension. One dot is activated in the second array showing deviation in the second dimension. When both dimensions are aligned to the center indicator, only the center indicator is activated.

According to one aspect, the indicators are formed by light emitting diodes (LED). When both axes coincide on the center LED, it glows brightly.

Alternative systems include three linear arrays of indicators intersecting at a center indicator, for displaying information about position in three dimensions.

The crossed dot bar graph display system is used in laser system having active mirror alignment with control for adjusting the tilt of the mirror about an X and a Y axis. In addition, the display can be adapted for showing translation of the mirror along a Z axis.

Accordingly, the present invention provides a system for displaying information concerning the position of a light beam that improves the usability of the information by an operator.

Other aspects and advantages of the present invention can be seen upon review of the figures, the detailed description and the claims which follow.

DETAILED DESCRIPTION

A detailed description of preferred embodiments of the present invention is provided with reference to the figures.

Figure 1:
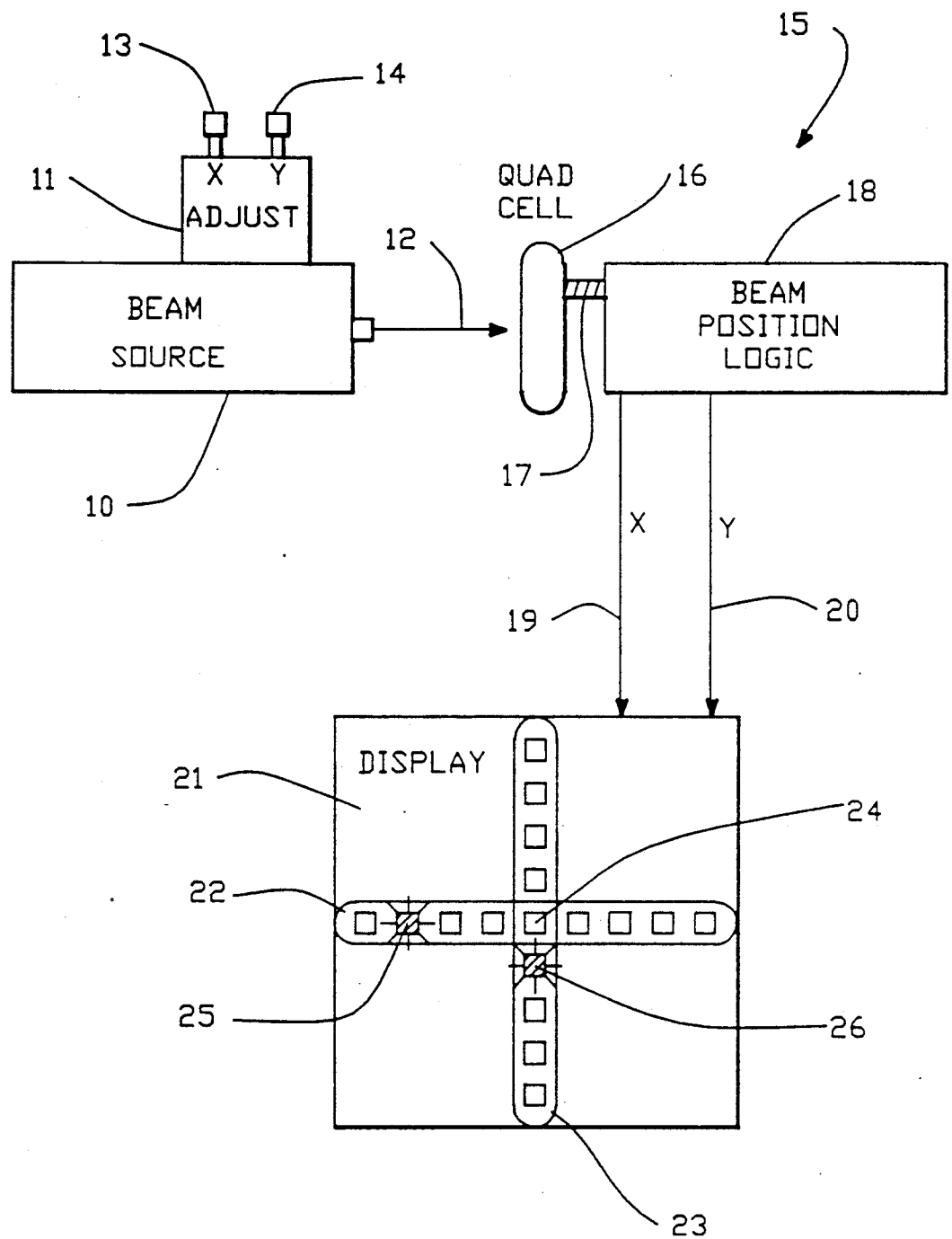
FIG. 1 is a schematic diagram of a laser system according to the present invention.

FIG. 1 shows a system for displaying information concerning position of a light beam. The system includes a beam source 10, such as a laser, with an apparatus 11 for adjusting the position of the output beam 12 in X and Y dimensions orthogonal to the beam 12. The adjustment apparatus 11 includes an input for controlling the position of the beam in the X dimension 13, and an input 14 for controlling position of the beam in the Y position. A detector 15, which includes a four quadrant photodetector 16 (quadcell) coupled across line 17 to beam position logic 18, generates a first signal 19 indicating position of the beam along the X dimension, with reference to a center point on the quadcell 16, and a second signal 20 indicating position of the beam along a Y dimension with reference to the center point of the quadcell 16.

The beam position logic may be implemented, for instance, as described in my co-pending U.S. patent application entitled BEAM POSITION SENSOR WITH TIME SHARED NORMALIZING CIRCUIT, filed Dec. 19, 1989, which is owned by the same assignee now, and was at the time of invention, as the present invention.

The first signal on line 19 and the second signal on line 20 are coupled to a display system 21. The display system includes a first set 22 of indicators, such as light emitting diodes, arranged in a linear array.

Likewise, a second set 23 of indicators is arranged in a linear array on the display system 21. The first set 22 and the second set 23 share and intersect at one member 24 in the center of each of the linear arrays.

The first set of indicators 22 indicates position along the X dimension with respect to the center of the quadcell. The second set 23 of indicators indicates position along the Y dimension with respect to the center of the quadcell.

Thus, as indicated in the figure, the beam may be positioned at an offset to the left along the X axis and slightly downward along the Y axis. In this case, the indicator 25 in the first set 22 would be activated, and the indicator 26 in the second set 23 would be activated. The operator could then adjust the position of the beam using inputs 13 and 14 until it is centered.

When the beam is centered along a single axis, the center indicator 24 is activated. When it is centered along both axes, the indicator 24 shines more brightly.

Figure 2:
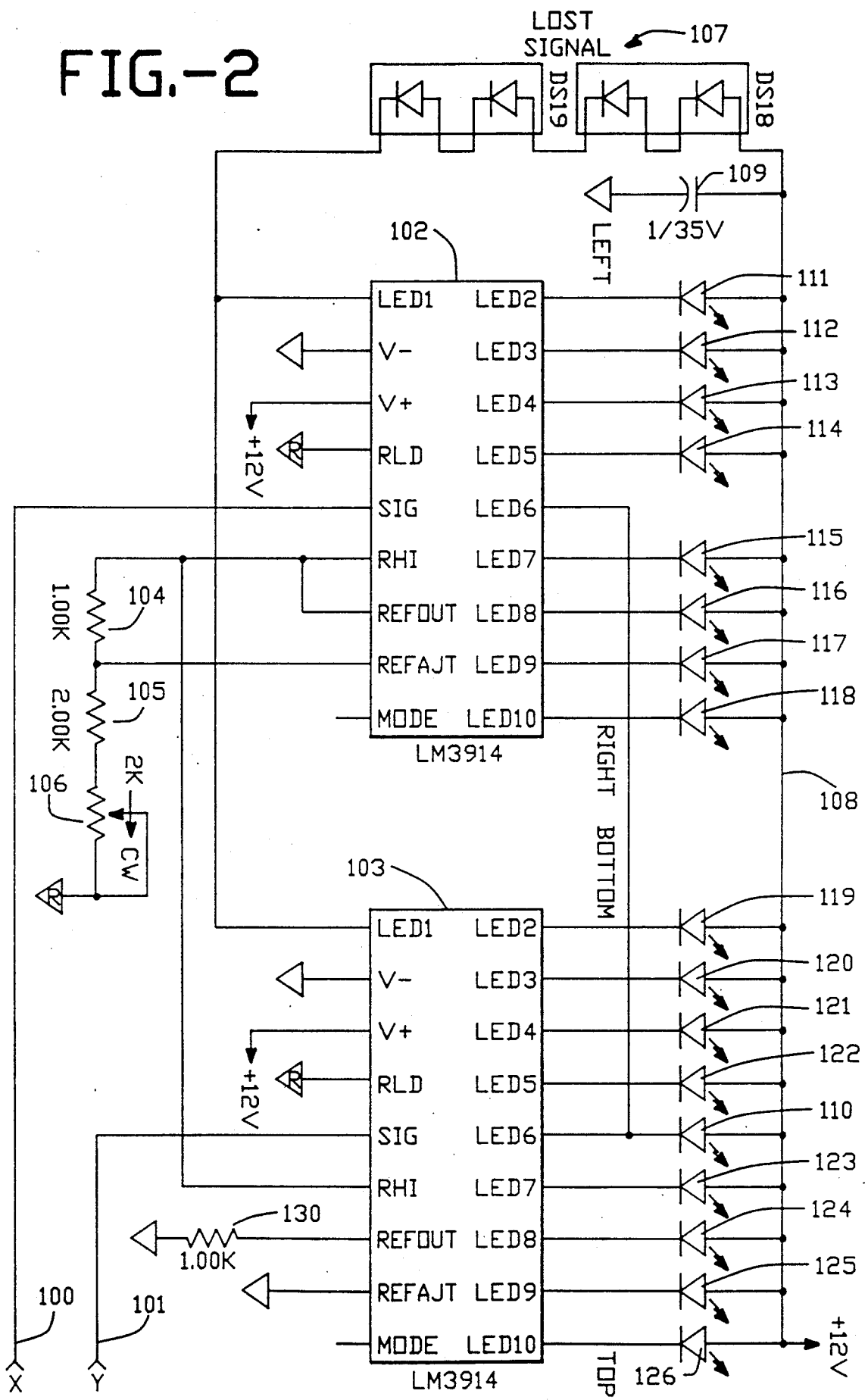
FIG. 2 is a circuit diagram of the display according to the present invention.

The display system circuit is illustrated in FIG. 2. In FIG. 2, the resistance and capacitance values and part numbers are provided as examples of a system actually implemented. Of course, the equivalent parts could be substituted, and other circuits could be used.

In the circuit of FIG. 2, a first signal indicating X position is supplied on line 100. A second signal indicating Y position is supplied on line 101. The signal on line 100 is supplied to a LED driver circuit 102 for controlling operation of the array of LEDs indicating position in the X dimension. The dynamic range of the LED driver 102 is calibrated using the calibration circuit, which is coupled to the RHI terminal and the REFOUT terminal. The calibration circuit includes resistor 104, resistor 105 and potentiometer 106 connected in series to ground. The node between resistors 104 and 105 is connected to the REFADJ input to the LED driver 102. These components are selected so that the dynamic range of motion of the mirror matches the dynamic range of the LED drivers 102, 103.

The signal on line 101 supplying Y dimension information is supplied as the SIG input to the LED driver 103. The RHI inputs of LED drivers 102 and 103 are coupled together. The V− and V+ terminals of the drivers 102 and 103 are connected to ground and to the 12 volt supply, respectively. The RLO terminals are connected to ground. The MODE terminals are not used. The REFOUT terminal on driver 103 is connected through resistor 130 to ground.

The LED drivers 102 and 103 each include ten LED outputs, LED1-LED10. LED1 in each driver 102, 103 is coupled to a lost signal indicator 107, which consists of four light emitting diodes in sequence coupled to the positive reference voltage on line 108 The positive reference voltage line 108 is bypassed through capacitor 109 to GROUND.

The outputs LED2-LED10 of the drivers 102, 103 are each coupled to LEDs in the linear arrays of indicators for displaying position information. The output LED6 of driver 102 and the output LED6 of driver 103 are coupled to and share the center LED 110. The other outputs LED2-LED5 and LED7-LED10 of driver 102 are coupled to the linear array of diodes going from left to right across the screen, including LEDs 111-114 and LEDs 115-118.

Likewise, the outputs LED2-LED5 and LED7-LED10 of LED driver 103 are coupled to the indicators in the vertical array of indicators, including LEDs 119-122 and LEDs 123-126.

The anodes of each of the LEDs 110-126 are coupled to the 12 volt reference line 108.

In operation, if a very low signal is supplied on the X or Y signal lines 100, 101, then the lost signal indicator 107 is illuminated. Otherwise, the LED drivers 102, 103 generate an output signal on one of the outputs LED2-LED10, indicating relative position of the beam in response to the corresponding input signal. When both LED drivers 102, 103 receive signals indicating that the beam has been centered, the output LED6 on each driver is driven, resulting in actuating the LED 110 with extra brightness.

Figure 3:
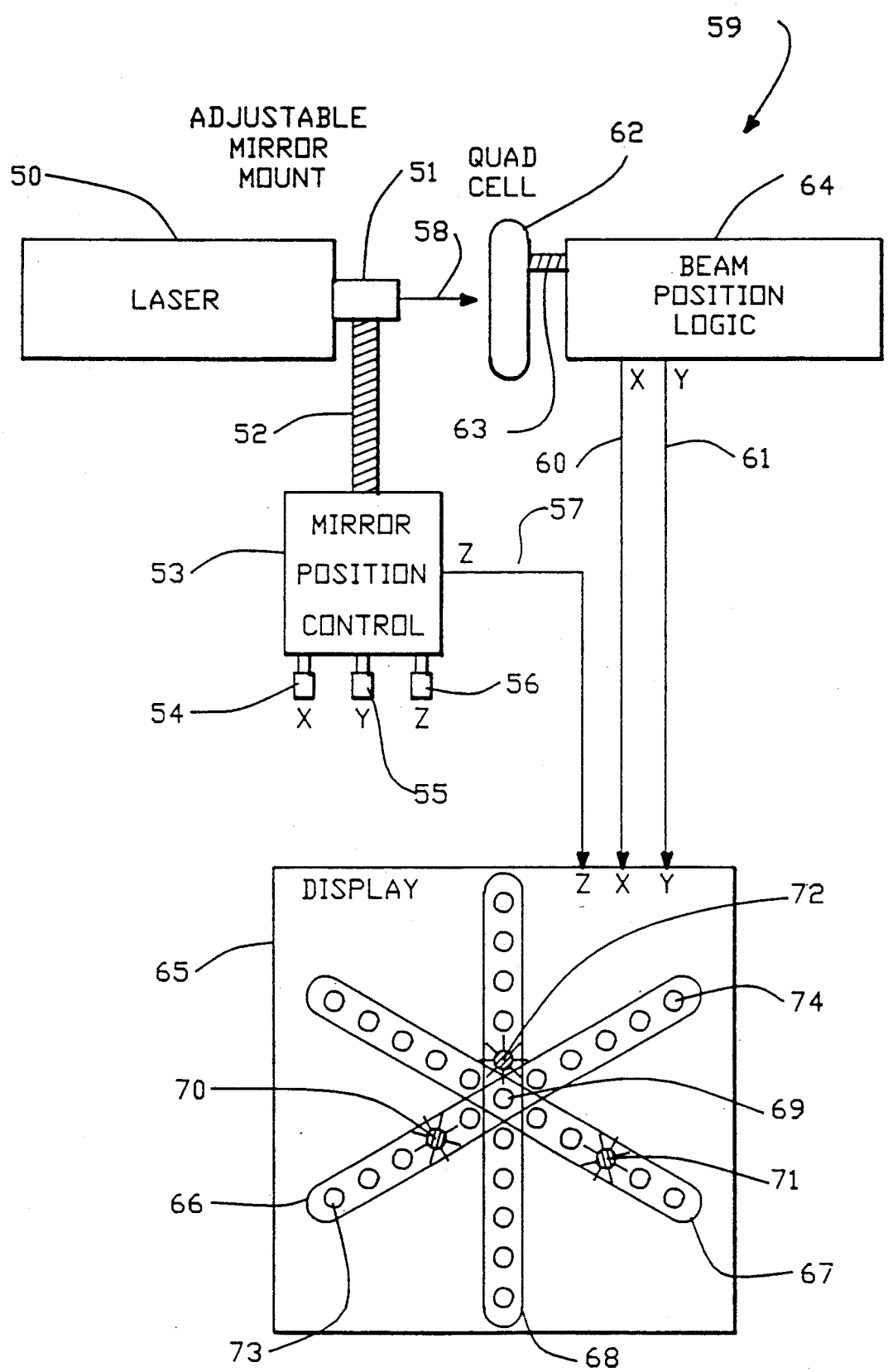
FIG. 3 is a schematic diagram of a laser system with active mirror position control in three dimensions according to the present invention.

FIG. 3 is a schematic diagram of an application of the present invention as an improvement to a laser system having an adjustable mirror mount, and displaying information in three dimensions.

The system includes a laser 50 having an adjustable mirror mount 51 The adjustable mirror mount is coupled across lines 52 to mirror position control apparatus 53. The mirror position control apparatus includes a first input 54 for controlling position in the X dimension by tilt of the mirror along a Y axis, a second input 55 for controlling position in the Y dimension by tilt of the mirror along an X axis, and a third input 56 for controlling translation of the mirror along a Z axis. The mirror position control supplies an output signal on line 57 indicating the translation of the mirror along the Z axis.

The adjustable mirror mount 51 and mirror position control 53 can be implemented using any variety of conventional techniques.

The laser 50 generates an output beam 58. The detector 59 is placed in the path of the output beam for generating a first signal 60 for indicating position of the beam 58 along the X axis, and a second signal 61 for indicating position of the beam 58 along the Y axis. The detector 59 includes a quadcell 62 coupled across line 63 to beam position logic 64.

The signals on lines 57 indicating position along the Z axis, 60 indicating position along the X axis, and 61 indicating position along the Y axis, are coupled to a display system 65. The display system includes a first set 66 of indicators arranged in a linear array for indicating position of the beam along the X axis. Likewise, a second set 67 of indicators arranged in a linear array indicates position along the Y axis. Finally, a third set of indicators 68 arranged in a linear array indicates position of the beam along the Z axis.

The first, second and third sets intersect at, and share, indicator 69. The indicator 69 indicates that the beam is positioned at a reference point on quadcell 62 and at a reference position along the Z axis of the mirror mount 51.

Accordingly, if the beam is positioned to the left and slightly low of the center on the quadcell 62, and positioned ahead of the center position along the Z axis, then indicator 70 along the set 66 indicating X position, indicator 71 in the set 67 of indicators indicating Y position, and indicator 72 in the set 68 of indicators indicating Z position, are illuminated.

When the beam is positioned at the center along one or all of the dimensions, then the indicator 69 is illuminated.

In operation, an operator of the mirror position control 53 will view the display 65 and manipulate the inputs 54, 55 and 56 to align the output beam 58.

Because the operator views a single display for information in all three dimensions, the alignment task is simplified.

Accordingly, the present invention provides a system for displaying information about the position of a beam of light, or the tilt and translation of a mirror in a laser system, that is easily utilized by an operator to align the system or to position the beam. This is particularly useful in systems in which the operator has inputs corresponding to specific dimensions on the display. The linear arrays adapted to correspond to each of such specific dimensions provide tight interaction between the operation of controlling the position and viewing the display.

Furthermore, the display can be utilized to indicate position of the beam with respect to the dynamic range of positioning. In this system, the indicator 73 at the end of the first linear ray 66, and the indicator 74 at the opposite end of the first linear ray 66, are illuminated when the beam position has been adjusted to near the maximum dynamic range of the adjustable mirror mount 51. Likewise, the end points of the second set 67 and third set 68 indicate dynamic range information.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for displaying information concerning position of a light beam; comprising:

detector means, having a face with a reference point, for generating a first signal indicating position of a light beam incident on the face in a first dimension relative to the reference point, and a second signal indicating position of the light beam incident on the face in a second dimension relative to the reference point;

display means, connected to the detector means, for displaying information concerning position of the beam in response to the first and second signals, including a first set of indicating means, mounted in a linear array, each of the indicating means in the first set for indicating a respective position in the first dimension of the beam relative to the reference point, and a second set of indicating means, mounted in a linear array, each of the indicating means in the second set for indicating a respective position in the second dimension of the beam relative to the reference point, wherein the first and second sets intersect in one member and the respective position indicated by the one member is the reference point in the first dimension or the second dimension.

2. The apparatus of claim 1, wherein the first dimension is perpendicular to the second dimension.

3. The apparatus of claim 1, wherein the first dimension and second dimension intersect at a prespecified angle, and the first linear array and second linear array intersect at the prespecified angle.

4. The apparatus of claim 1, wherein the first linear array has a center at a center point, and the second linear array has a center at the center point, and the one member is positioned in the first and second linear arrays at the center point.

5. The apparatus of claim 1, wherein the indicating means comprise light emitting diodes.

6. In a laser system generating a light beam, and including a cavity mirror mounted on an adjustable mirror mount with control for adjusting the tilt the mirror around an x-axis and a y-axis; an improvement for providing mirror position information to an operator, comprising:

detector means, having a face with a reference point and coupled with the laser system so that the light beam is incident on the face, for generating a first signal indicating position of the light beam along the x-axis relative to the reference point, and a second signal indicating position of the light beam along the y-axis relative to the reference point; and display means, connected to the detector means, for displaying information concerning position of the beam in response to the first and second signals, including a first set of indicating means, mounted in a linear array, each of the indicating means in the first set for indicating a respective position along the x-axis of the beam relative to the reference point, and a second set of indicating means, mounted in a linear array, each of the indicating means in the second set for indicating a respective position along the y-axis of the beam relative to the reference point; wherein the first and second sets intersect in one member and the respective position indicated by the one member is the reference point along the x- and y-axes.

7. The improvement of claim 6, wherein the first linear array has a center at a center point, and the second linear array has a center at the center point, and the one member is positioned in the first and second linear arrays at the center point.

8. The improvement of claim 6, wherein the indicating means comprise light emitting diodes.

9. The improvement of claim 6, wherein the adjustable mirror mount has a dynamic range, and further including;

means for calibrating the first and second linear arrays so that they indicate position of the beam with respect to the dynamic range of the mirror mount.

10. In a laser system generating a light beam, and including a cavity mirror mounted on an adjustable mirror mount with control for adjusting the tilt the mirror around an x-axis and a y-axis and translation of the mirror along a z-axis; an improvement for providing mirror position information to an operator, comprising:

detector means, having a face with a reference point and coupled with the laser system so that the light beam is incident on the face, for generating a first signal indicating position of the light beam along the x-axis relative to the reference point, and a second signal indicating position of the light beam along the y-axis relative to the reference point;

means, coupled to the laser system, for supplying a third signal indicating position along the z-axis of the mirror with respect to a reference position;

display means, connected to the detector means and the means for supplying, for displaying information concerning position of the beam in response to the first, second and third signals, including a first set of indicating means, mounted in a linear array, each of the indicating means in the first set for indicating a respective position along the x-axis of the beam relative to the reference point, a second set of indicating means, mounted in a linear array, each of the indicating means in the second set for indicating a respective position along the y-axis of the beam relative to the reference point, and a third set of indicating means, mounted in a linear array, each of the indicating means in the third set for indicating a respective position along the z-axis of the beam relative to the reference position; wherein the first, second and third sets intersect in one member and the respective position indicated by the one member is the reference point along the x- and y-axes, and the reference position along the z-axis.

11. The improvement of claim 10, wherein the first linear array has a center at a center point, the second linear array has a center at the center point, and the third linear array has a center at the center point, and wherein the one member is positioned in the first, second and third linear arrays at the center point.

12. The improvement of claim 10, wherein the indicating means comprise light emitting diodes.

13. The improvement of claim 10, wherein the tilt of the adjustable mirror mount has a dynamic range, and further including;

means for calibrating the first and second linear arrays so that they indicate position of the beam with respect to the dynamic range of the mirror mount.

* * * * *